Feb. 18, 1969     T. J. LYNCH     3,428,303
FLUID SPRING DEVICE
Filed June 9, 1966
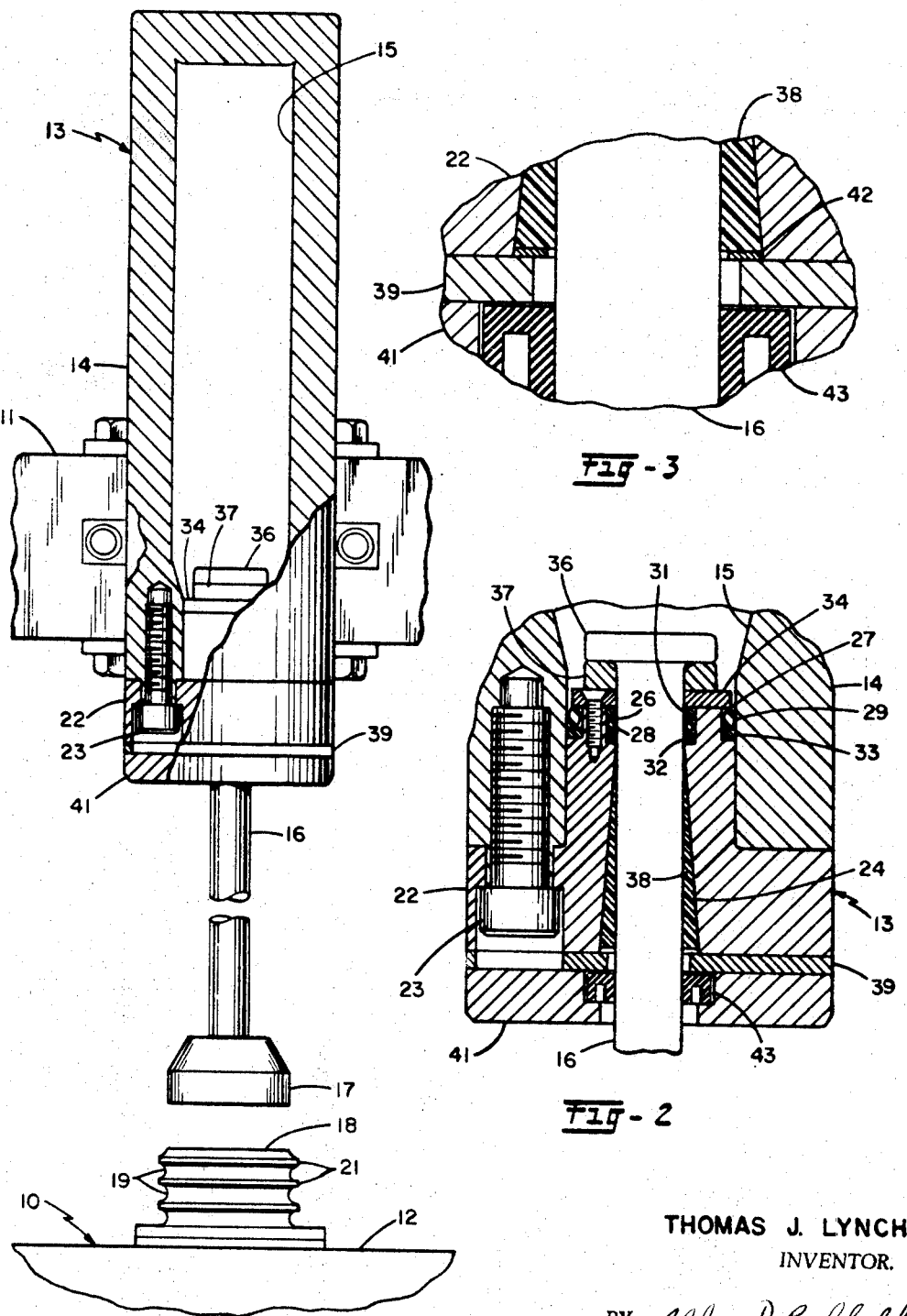
THOMAS J. LYNCH
INVENTOR.
BY *Alden D. Redfield*
*Aubrey C. Brine*
ATTORNEYS

United States Patent Office 3,428,303
Patented Feb. 18, 1969

3,428,303
FLUID SPRING DEVICE
Thomas J. Lynch, North Chelmsford, Mass., assignor to Avco Corporation, Cincinnati, Ohio, a corporation of Delaware
Filed June 9, 1966, Ser. No. 556,425
U.S. Cl. 267—65           5 Claims
Int. Cl. B60g *11/26;* F16d *57/00;* F16f

ABSTRACT OF THE DISCLOSURE

The invention is directed to a fluid spring device designed to operate under high fluid pressures and includes a sealing means and bearing means for the plunger, in combination, whereby the integrity of the seal is maintained under high pressure conditions. The alignment of the plunger is also maintained in a simple and facile manner. The sealing means comprises an O ring situated in a groove in combination with a tapered bearing having a pointed apex situated adjacent to the sealing means to prevent extrusion thereof.

---

This invention relates to fluid cylinders and more particularly to a device commonly known as a fluid spring.

Many types of fluid spring devices are available on the market today, and have been successfully employed in various applications where a spring action is desired. Generally, these devices utilize the compressibility of fluids in a closed cylinder containing the fluid, the volume of the cylinder is decreased and the fluid is compressed, storing energy therein.

Fluid springs of the construction described have a great many diversified uses. One typical use is in impact devices employed in the shock test machine art, where the shock pulse (acceleration vs. time characteristic) produced during the impact of a carriage and specimen against a base is determined by employing the action of the spring. In this application, the maximum plunger speed relative to the seals is determined by the carriage velocity required to produce the shock pulse. As it is obvious to one familiar with the art in an application of this type, the guidance of the carriage relative to the base cannot be completely rigid. The fluid spring therefore, must be able to function in the presence of high lateral deflections normal to the axis of the center line of the fluid spring.

It is therefore, an object of the present invention to provide a fluid spring which has a capability of containing a fluid over a wide range of pressures, and plunger speeds.

A further object of the present invention is to provide a fluid spring which operates in a satisfactory manner when subjected to large lateral loads.

Another object of the present invention is to provide a fluid spring which is both simple and economical to manufacture, and easily assembled and repaired.

These objects of the invention and other objects which will be apparent as the description proceeds, are achieved by providing a fluid spring comprising a vessel containing a fluid under pressure, a plunger, and a housing which is attached by fasteners to the vessel.

As the plunger is forced into the fluid, the fluid is compressed to produce a resisting pressure. The pressure reacts on the plunger to produce a resisting force, thus providing the spring action.

In the present invention, the unique design and location of the housing, seals and bearing in combination with the plunger, provide a device which is susceptible of maintaining high pressure while having the plunger subjected to substantial lateral forces. In addition, the unique sealing arrangement provided in combination with a plunger arrangement which does not slide against the wall of the vessel, produce a device wherein close tolerances in the vessel bore diameter, concentricity and surface finishes, etc., are kept to a minimum. The device therefore is susceptible of inexpensive manufacture compared with prior art fluid springs.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is an elevational view showing a fluid spring constructed in accordance with the teachings of the present invention, and employed in a shock test machine.

FIGURE 2 is a sectional elevational view showing details of a portion of the fluid spring device depicted in FIGURE 1, taken on an enlarged scale for clarity, and FIGURE 3 is a sectional elevational view of the structure of FIGURE 2 taken on an enlarged scale and showing details of the adjustable feature of the present invention.

Referring now to the drawings, especially FIGURE 1, there is shown a shock test machine 10 having a carriage 11 designed to support a specimen (not shown) to be tested. The carriage 11 may be guided by any suitable supporting means (not shown) and is propelled to impact against the base 12 by a force, such as gravity. As a means of producing a predetermined shock pulse on the carriage 11 and the specimen, a fluid spring device 13 is attached to the carriage.

The fluid spring device 13 generally comprises structure including cylinder 14 defining an elongated chamber 15 containing the fluid employed, additionally, the device 13 employs a plunger rod 16 having a portion disposed in the fluid and a portion extending from the chamber 15 to impact adjacent the base 12. The end of the plunger rod 16 extending toward the base 12 is provided with an end cap 17 which may be fabricated from steel or any other suitable material and serves to distribute the load or force over a large area when the plunger rod 16 makes contact with the base 12.

It will be noted that the base 12 is provided with a cushion 18 having a plurality of rubber discs 19 and metal discs 21 fabricated in alternate layers to receive the impact from the end cap 17. The cushion 18 is firmly attached to the base 12 and the discs 19 and 21 are bonded one to another by any manner well known in the art. The cushion 18 serves a dual purpose.

First, the cushion 18 provides some compression to allow the speed of the plunger rod 16 to decrease to that of the base 12 without inducing high impact stresses in the plunger. The carriage 11 may have a high velocity relative to the base 12 at the start of the shock pulse, and with the liquid spring traveling with the carriage, the plunger would experience high stresses as it impacts the base. Without the cushion therefore, the plunger rod 16 could be subjected to stresses causing permanent damage to the plunger and in any event resulting in high frequency noise or hash in the shock pulse. The cushion 18, therefore, provides a flexible coupling between the plunger rod 16 and the base 12 which tends to reduce the impact stresses and substantially reduce and isolate any noise coming from the base or other sources.

Additionally, the cushion 18 serves as a shear pad in that it allows the plunger 16 to move laterally relative to the base 12 to accommodate any lateral movement of the carriage 11 without application of high lateral loads to the plunger rod and related structure. The result of using the shear pad structure for the cushion 18 is the lessening of stress in the various fluid spring and shock machine elements and a decrease in deflection of the plunger rod 16 at the sealing areas. Bonding of the rubber to metal laminations gives greater compressive strength to the cushion 18 reducing the required size of the cushion as well as the end cap 17. In addition, the laminated design of the cushion 18 allows the designer to choose the stiffness in the lateral direction independently to the stiffness in the axial direction. Although in the present embodiment the cushion 18 is shown attached to the base 12, it should be evident that the above described effect would be produced in like manner should it be preferred to attach the cushion to the end cap 17.

In operation, the carriage 11 is propelled toward the base 12 in the usual manner with a force and travel necessary to produce the velocity required by the particular shock pulse. At impact, the end cap 17 contacts the cushion 18 and the plunger rod 16 is thereafter driven into the interior of the chamber 15.

The spring action is produced by the plunger rod 16 compressing the fluid in the chamber 15 and the predetermined shock pulse is imparted to the test specimen.

Those familiar with the art are aware that the shock pulse in a fluid spring of this type is dependent on the volume of the chamber 15, the plunger rod 16, and the fluid employed in the chamber and other variables. As the determination of these variables is well within the scope of one familiar with the art, they will not be discussed in detail here, as they form no part of the present invention.

Referring now particularly to FIGURE 2, it will be seen that the plunger rod 16 extends into the chamber 15 through a housing 22. The housing 22 is fastened to the end of the cylinder 14 by any suitable means as bolts 23 having their heads recessed into the housing.

A portion of the housing 22 extends in interfitting engagement with the inner walls of the cylinder 14, and has a passage formed therethrough which includes tapered wall 24. The wall 24 has its smaller diameter circular opening adjacent a circumferential groove 26 formed at the inner face of the housing 22 and tapers outwardly to a larger diameter circular opening at the outer face of the housing.

The inner face of the housing 22 has another larger circumferential groove 27 formed therein, which together with the groove 26 provides sealing means for maintaining fluid pressure in the chamber 15.

Each of the sealing grooves 26 and 27 is open inwardly of the chamber 15 and is provided with suitable sealing elements. The large diameter groove 27 contains a seal preferably comprising the conventional O-ring 29 and a single solid plastic back up ring 33, whereas the groove 26 contains a seal preferably comprising a rubber O-ring 28 and a pair of solid plastic back up rings 31 and 32.

A cover plate 34 is disposed adjacent the inner face of the housing 22 to retain the O-rings 28 and 29 and back up rings 31, 32 and 33 in each of the grooves 26 and 27.

Due to the novel construction, the sealing elements may be of either split or solid (continuous) construction and may be of flexible or rigid material. Each of the back up rings 31 and 32 provided in the groove 26 is in intimate contact with the plunger rod 16, and the back up ring 33 located in the groove 27 is in intimate contact with the bore of the cylinder 14 to prevent O-ring extrusion.

The two back up rings 31 and 32 are provided in the groove 26 to prevent O-ring extrusion into the fluid which might occur while fluid pressure is low and the plunger rod 16 is sliding into the fluid, and to prevent O-ring extrusion which may result from fluid pressure and drag between the O-ring 28 when the plunger rod is moving out in the fluid.

As will be noted, the plunger rod 16 is provided with a radially outwardly extending flange 36 and a bumper 37 of flexible material affixed thereto, which is a ring of rubber or other elastomeric material. The purpose of the bumper is to control the return of the plunger to its fully extended position as the shock pulse ends.

The cover plate 34 therefore serves also as a stop for the bumper 37 when the plunger rod 16 is in its fully extended position.

The tapered wall 24 is machined to a close tolerance to receive the insert bearing 38 which has a tapered outer surface substantially conforming to the wall. The bearing 38 is machined to a close tolerance and provided with an inner circular bore for receiving the plunger rod 16 when the bearing is disposed adjacent the tapered wall 24 of the housing 22.

The material for bearing 38 may be any one of a number of plastics which have been developed for bearing applications and which provide high strength, conformability, embeddability, non-galling features and low friction (both static and dynamic).

The bearing 38 is held in place by a retainer plate 39 which is fastened to the housing 22 by screws, or any other suitable means.

Adjacent the retainer plate 39 on the far side from the fluid there is located an end plate 41 containing a scraper seal 43. The scraper seal 43 may be any of a number of commercial devices available on the market which perform the functions of grease seal and scraper for the plunger rod 16.

The scraper seal 43 removes any contaminates from the plunger rod 16 which may cause damage to the insert bearing 38, and in addition, seals and retains in the insert area the lubricants put there at assembly. The lubricants are sealed at the opposite end of the insert bearing by the O-ring 28 retained in the groove 26.

In assembling the fluid spring device 13, the housing 22 is first prepared by placing the O-rings 28 and 29 and back up rings 31, 32 and 33 in the grooves 26 and 27, after which the cover plate 34 is fastened to the housing. The plunger rod 16, with the end cap 17 removed, is now inserted through the cover plate 34, and the O-ring 28, to the point at which the bumper 37 is disposed adjacent the cover plate.

The bearing 38 may now be passed over the extended end of the plunger 16 (with end cap 17 removed) and moved to its position adjacent the tapered wall 24. The retainer plate 39 is positioned adjacent the outer face of the housing 22 and fastened in place forcing the bearing 38 into a substantially close fitting engagement with the rod 16 and the tapered wall 24. The housing 22 and the piston rod 16 thus assembled, are fastened to the cylinder by bolts 23 which may be inserted through clearance holes located in the plate 39.

The assembly is now completed with the addition of an end plate 41 containing the seal 43, and the end cap 17.

The tapered shape of the bearing 38 provides the advantages of the prior art without the difficulties of manufacture. Because of the excellent bearing properties of several plastics, especially where high loads and low friction requirements exist, these plastics have found prior use in fluid springs. However, because of these plastics' low modulus of elasticity, the bearing members often suffer a relatively large deflection under load, which deflection is conducive to seal extrusion. Also, the coefficient of thermal expansion of most plastics is relatively large with a result that these materials undergo relatively large dimension change with a change in ambient temperature or as a result of heat buildup due to sliding friction. The latter heat build-up is aided by the low thermal conductivity of these plastic materials. The solution to these problems in the prior art has been to use extremely thin bearings of the plastic materials, which require exacting procedures for bonding, assembly and machining.

The tapered shape of the insert bearing 38 provides the very thin wall adjacent to the groove 26, where the thin section is required to prevent seal extrusion as discussed above. This thin section of the bearing 38, supported by the rigid housing 22, provides a very rigid support in the lateral direction which minimizes rod deflection at the areas where sealing is accomplished. Thus, extrusion and nibbling of the seal are prevented as the rod 16 is held firmly solely by the bearing 38.

Referring now to FIGURE 3, it will be seen that with the novel arrangement provided, it is possible to compensate for small amounts of wear or manufacturing tolerances, on the inner circular bore of the bearing 38. By introducing a thin layer of shim material 42 between the bearing 38 and the retainer plate 39, it is possible to force the bearing into the housing 22 whereby the wedge configuration of the tapered wall 24 causes the diameter of the circular bore to be reduced slightly.

A similar result may be attained by removing the retainer plate 39 and matching the surface between the housing 22 and the retainer plate to produce a lip adjacent the insert bearing 38.

The various advantages of the present invention should be apparent to the reader from the foregoing description of the disclosed structure.

It will first be noted that the plunger rod 16 does not slide against the walls of the cylinder 14, thereby eliminating the necessity to hold close tolerances on the bore diameter concentricity and surface finish. Only that portion of the cylinder 14 which receives the housing 22 need be manufactured to close tolerance.

Additionally, by piloting the housing 22 into the cylinder 14 with the O-ring 29 between the cylinder and the housing located adjacent the inner wall of the cylinder, a net wall area as large as, or larger than, the wall area at other sections of the cylinder is provided. This large wall area provides for lower stresses resulting from the internal fluid pressure and lateral loads imparted to the housing 22.

The increased wall thickness also reduces the outward deflection of the wall due to internal pressure, which allows a greater pressure to be sealed before extrusion of the O-ring 29, occurs between the cylinder 14 and the housing 22.

The reader's attention is drawn to the grooves 26 and 27 which open inwardly to the chamber 15 and are covered by the cover plate 34 which is removable. The combination of a removable cover plate 34 with the grooves 26 and 27 allows the use of O-rings 28 and 29 and back up rings 31, 32 and 33 which are unsplit. The O-rings 28 and 29 and back up rings 31, 32 and 33 may also be made of a stiff material as they need not be greatly expanded, compressed, or otherwise distorted to be placed into the grooves 26 and 27.

The providing of a thin section in the tapered bearing 38 also minimizes dimensional changes in the bearing due to changes in ambient temperature. Further the insert bearing 38 is in intimate contact with the housing 22 which is generally fabricated of a metal material. The wall of the insert bearing 38 is generally sufficiently thin that any heat generated by friction between the insert bearing and the plunger rod 16 is rapidly dissipated through the metal housing 22, eliminating undesirable thermal effects on the insert bearing.

The tapered shape of the bearing 38 provides a relatively thick wall remote from the critical seal area. This thick wall enables the use of a mechanical means of retention such as retainer plate 39, thus eliminating the costly and exacting procedures associated with bonded bearings. The bearing 38 is therefore, easy to install and readily removed, replacement being accomplished by sliding a new insert bearing 38 over the rod 16 without disassembling the entire device 13 and without bonding and machining a new insert in place.

The ability to force the tapered insert bearing 38 into the tapered wall 24 in the housing 22 to close the bore of the insert bearing, provides a means for decreasing the bore of the bearing adjustment with disassembly of the entire fluid spring device 13.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A fluid spring device comprising:
   structure defining a chamber for containing fluid under pressure,
   said structure having a passage provided therein for entry into said chamber,
   a portion of said passage being defined by a tapered wall forming a first circular opening near said chamber and tapering outwardly of said chamber to form a larger diameter opening in said structure,
   a bearing having a tapered outer surface received in interfitting engagement with said tapered wall and having a circular bore provided axially therethrough,
   a plunger rod having a portion thereof disposed in said chamber and a portion extending through said circular bore to receive lateral support from said bearing, and
   a groove formed in said structure opening adjacent said plunger rod and opening into said chamber,
   an O-ring disposed in said groove and having said plunger rod extending therethrough, and
   a removable plate disposed in said chamber and covering said groove opening into said chamber to retain said O-ring in said groove.

2. A fluid spring device comprising:
   structure defining a chamber for containing fluid under pressure,
   said structure having a passage provided therein for entry into said chamber,
   a portion of said passage being defined by a tapered wall forming a first circular opening near said chamber and tapering outwardly of said chamber to form a larger diameter opening in said structure,
   a readily removable bearing having a tapered outer surface received in interfitting engagement with said tapered wall and having a circular bore provided axially therethrough,
   a plunger rod having a portion thereof disposed in said chamber and a portion extending through said circular bore to thereby receive lateral support from said bearing, and
   means on said structure for decreasing the diameter of said circular bore by forcing said bearing inwardly toward said chamber,
   a groove formed in said structure opening adjacent said plunger rod and opening into said chamber,
   an O-ring disposed in said groove and having said plunger rod extending therethrough, and
   a removable plate disposed in said chamber and covering said groove opening into said chamber to retain said O-ring in said groove.

3. The structure of claim 2 wherein said means for decreasing the diameter of said circular bore comprises a readily removable retainer member disposed adjacent said structure and in contact with said bearing whereby said bearing is moved inwardly toward said chamber by the introduction of shim material between said retainer member and said bearing.

4. The fluid spring device of claim 2 wherein said first circular opening in said structure passage and said circular bore in said bearing are substantially of equal diameter.

5. The structure of claim 2 wherein said bearing member is fabricated from a resilient plastic material.

References Cited

UNITED STATES PATENTS

| | | | |
|---|---|---|---|
| 1,404,780 | 1/1922 | Mason | 308—3.5 |
| 1,576,376 | 3/1926 | Sudekum. | |
| 2,511,360 | 6/1950 | Heinrich | 308—4 X |
| 2,913,251 | 11/1959 | Herbenar. | |
| 3,186,702 | 6/1965 | Taylor | 188—100 X |
| 3,228,672 | 1/1966 | Bresk et al. | 188—96 X |
| 3,311,030 | 3/1967 | Halstead | 308—3.5 X |

DUANE A. REGER, *Primary Examiner.*

U.S. Cl. X.R.

188—100; 267—001; 308—3.5, 4